(12) United States Patent
Mårtensson (10) Patent No.: US 8,875,465 B2
(45) Date of Patent: *Nov. 4, 2014

(54) FLOORING PANEL OR WALL PANEL AND USE THEREOF

(75) Inventor: Göran Mårtensson, Klagstord (SE)

(73) Assignee: Pergo (Europe) AB, Trelleborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,098

(22) Filed: Sep. 14, 2012

(65) Prior Publication Data

US 2013/0042555 A1    Feb. 21, 2013

Related U.S. Application Data

(63) Continuation of application No. 12/979,086, filed on Dec. 27, 2010, now Pat. No. 8,276,342, which is a continuation of application No. 12/188,639, filed on Aug. 8, 2008, now Pat. No. 7,856,784, which is a continuation of application No. 10/158,945, filed on Jun. 3, 2002, now Pat. No. 7,497,058, which is a continuation of application No. 09/637,036, filed on Aug. 10, 2000, now Pat. No. 6,397,547, which is a continuation of application No. 08/894,966, filed as application No. PCT/SE96/00256 on Feb. 29, 1996, now Pat. No. 6,101,778.

(30) Foreign Application Priority Data

Mar. 7, 1995    (SE) ...................................... 9500810

(51) Int. Cl.
*E04B 1/38*    (2006.01)

(52) U.S. Cl.
USPC ........ 52/582.1; 52/586.1; 52/591.1; 52/591.3; 52/591.4; 52/592.1; 52/592.2

(58) Field of Classification Search
USPC ............ 52/582.1, 586.1, 591.1, 591.3, 591.4, 52/592.1, 592.2
See application file for complete search history.

(56) References Cited

U.S. PATENT DOCUMENTS

| 208,036 A | 9/1878 | Robley |
|---|---|---|
| 213,740 A | 4/1879 | Conner |

(Continued)

FOREIGN PATENT DOCUMENTS

| AU | 199732569 | 12/1999 |
|---|---|---|
| AU | 200020703 | 6/2000 |

(Continued)

OTHER PUBLICATIONS

Appeals from the United States Court for the Eastern District of Wisconsin; Consilidated case No. 02.

(Continued)

*Primary Examiner* — Jeanette E. Chapman
(74) *Attorney, Agent, or Firm* — Jenkins, Wilson, Taylor & Hunt, P.A.

(57) ABSTRACT

Flooring panel or wall panel and a use thereof in a wet room. The panel is provided with a locking means in the form of groove and tongue forming a tongue/groove joint for assembling of the panels. The groove and the tongue are preferably made of water tight material and formed with a snap-together joint.

9 Claims, 1 Drawing Sheet

(56) References Cited

U.S. PATENT DOCUMENTS

| | | | |
|---|---|---|---|
| 308,313 A | 11/1884 | Gerike | |
| 342,529 A | 5/1886 | McRae | |
| 502,289 A * | 8/1893 | Feldman | 52/578 |
| 662,458 A | 11/1900 | Nagel | |
| 714,987 A | 12/1902 | Wolfe | |
| 752,694 A | 2/1904 | Lund | |
| 753,791 A | 3/1904 | Fulghum | |
| 769,355 A | 9/1904 | Platow | |
| 832,003 A | 9/1906 | Torrence | |
| 847,272 A | 3/1907 | Ayers | |
| 877,639 A | 1/1908 | Galbraith | |
| 898,381 A | 9/1908 | Mattison | |
| 1,000,859 A | 8/1911 | Vaughan | |
| 1,002,102 A | 8/1911 | Weedon | |
| 1,016,383 A | 2/1912 | Wellman | |
| 1,097,986 A | 5/1914 | Moritz | |
| 1,124,226 A | 1/1915 | Houston | |
| 1,124,228 A | 1/1915 | Houston | |
| 1,137,197 A | 4/1915 | Ellis | |
| 1,140,958 A | 5/1915 | Cowan | |
| 1,266,253 A | 5/1918 | Hakason | |
| 1,319,286 A | 10/1919 | Johnson et al. | |
| 1,357,713 A | 11/1920 | Lane | |
| 1,407,679 A | 2/1922 | Ruchraugg | |
| 1,454,250 A | 5/1923 | Parsons | |
| 1,468,288 A | 9/1923 | Fen | |
| 1,510,924 A | 10/1924 | Daniels et al. | |
| 1,540,128 A | 6/1925 | Houston | |
| 1,575,821 A | 3/1926 | Daniels | |
| 1,576,527 A | 3/1926 | McBride | |
| 1,576,821 A | 3/1926 | Daniels | |
| 1,602,256 A | 10/1926 | Sellin | |
| 1,602,267 A | 10/1926 | Karwisde | |
| 1,615,096 A | 1/1927 | Myers | |
| 1,622,103 A | 3/1927 | Fulton | |
| 1,622,104 A | 3/1927 | Fulton | |
| 1,637,634 A | 8/1927 | Carter | |
| 1,644,710 A | 10/1927 | Crooks | |
| 1,657,159 A | 1/1928 | Greenebaum | |
| 1,660,480 A | 2/1928 | Daniels | |
| 1,706,924 A | 3/1929 | Kane | |
| 1,714,738 A | 5/1929 | Smith | |
| 1,718,702 A | 6/1929 | Pfiester | |
| 1,734,826 A | 11/1929 | Pick | |
| 1,736,539 A | 11/1929 | Lachman | |
| 1,764,331 A | 6/1930 | Moratz | |
| 1,772,417 A | 8/1930 | Ellinwood | |
| 1,776,188 A | 9/1930 | Langbaum | |
| 1,823,039 A | 9/1930 | Gruner | |
| 1,778,069 A | 10/1930 | Fetz | |
| 1,787,027 A | 12/1930 | Wasleff | |
| 1,801,093 A | 4/1931 | Larkins | |
| 1,843,024 A | 1/1932 | Werner | |
| 1,854,396 A | 4/1932 | Davis | |
| 1,859,667 A | 5/1932 | Gruner | |
| 1,898,364 A | 2/1933 | Gynn | |
| 1,906,411 A | 5/1933 | Potvin | |
| 1,913,342 A | 6/1933 | Schaffert | |
| 1,929,871 A | 10/1933 | Jones | |
| 1,940,377 A | 12/1933 | Storm | |
| 1,953,306 A | 4/1934 | Moratz | |
| 1,966,020 A | 7/1934 | Rowley | |
| 1,978,075 A | 10/1934 | Butterworth | |
| 1,986,739 A | 1/1935 | Mitte | |
| 1,988,201 A | 1/1935 | Hall | |
| 1,991,701 A | 2/1935 | Roman | |
| 2,004,193 A | 6/1935 | Cherry | |
| 2,015,813 A | 10/1935 | Nielsen | |
| 2,027,292 A | 1/1936 | Rockwell | |
| 2,044,216 A | 6/1936 | Klages | |
| 2,045,067 A | 6/1936 | Bruce | |
| 2,049,571 A | 8/1936 | Schuck | |
| 2,100,238 A | 11/1937 | Burgess | |
| 2,126,959 A | 8/1938 | Gilbert | |
| 2,138,085 A | 11/1938 | Birtles | |
| 2,141,708 A | 12/1938 | Elmendorf | |
| 2,142,305 A | 1/1939 | Davis | |
| 2,194,086 A | 3/1940 | Horn | |
| 2,199,938 A | 5/1940 | Kloote | |
| 2,222,137 A | 11/1940 | Bruce | |
| 2,238,169 A | 4/1941 | Heyn et al. | |
| 2,245,497 A | 6/1941 | Ptchen | |
| 2,253,943 A | 8/1941 | Rice | |
| 2,266,464 A | 12/1941 | Kraft | |
| 2,276,071 A | 3/1942 | Scull | |
| 2,280,071 A | 4/1942 | Hamilton | |
| 2,282,559 A | 5/1942 | Byers | |
| 2,324,628 A | 7/1943 | Kahr | |
| 2,363,429 A | 11/1944 | Lowry | |
| 2,398,632 A * | 4/1946 | Frost et al. | 428/309.9 |
| 2,405,602 A | 8/1946 | Nugent | |
| 2,430,200 A | 11/1947 | Wilson | |
| 2,487,571 A | 11/1949 | Maxwell | |
| 2,491,498 A | 12/1949 | Kahr | |
| 2,644,552 A | 7/1953 | MacDonald | |
| 2,717,420 A | 9/1955 | Georges | |
| 2,729,584 A | 1/1956 | Foster | |
| 2,740,167 A | 4/1956 | Rowley | |
| 2,780,253 A | 2/1957 | Joa | |
| 2,805,852 A * | 9/1957 | Ewert | 266/283 |
| 2,808,624 A | 10/1957 | Sullivan | |
| 2,823,433 A | 2/1958 | Kendall | |
| 2,839,790 A | 6/1958 | Collings | |
| 2,857,302 A | 10/1958 | Burton et al. | |
| 2,863,185 A | 12/1958 | Reidi | |
| 2,865,058 A | 12/1958 | Andersson et al. | |
| 2,878,530 A | 3/1959 | Hilding | |
| 2,894,292 A | 7/1959 | Gramelspacher | |
| 2,926,401 A | 3/1960 | Place | |
| 2,831,223 A | 9/1960 | DeShazor | |
| 2,952,341 A | 9/1960 | Weiler | |
| 2,996,751 A | 8/1961 | Roby | |
| 3,045,294 A | 7/1962 | Livezey, Jr. | |
| 3,090,082 A | 5/1963 | Bauman | |
| 3,100,556 A | 8/1963 | Ridder | |
| 3,125,138 A | 3/1964 | Bolenbach | |
| 3,128,851 A | 4/1964 | Deridder et al. | |
| 3,141,392 A | 7/1964 | Schneider | |
| 3,148,482 A | 9/1964 | Neale | |
| 3,162,906 A | 12/1964 | Dudley | |
| 3,182,769 A | 5/1965 | de Ridder | |
| 3,199,258 A | 8/1965 | Jentoft et al. | |
| 3,203,149 A | 8/1965 | Soddy | |
| 3,204,380 A | 9/1965 | Wilson | |
| 3,253,377 A | 5/1966 | Schakel | |
| 3,257,225 A | 6/1966 | Marotta | |
| 3,267,630 A | 8/1966 | Omholt | |
| 3,282,010 A | 11/1966 | King, Jr. | |
| 3,286,425 A | 11/1966 | Brown | |
| 3,296,056 A | 1/1967 | Bechtold | |
| 3,301,147 A | 1/1967 | Clayton et al. | |
| 3,310,919 A | 3/1967 | Bue | |
| 3,331,171 A | 7/1967 | Hallock | |
| 3,339,329 A | 9/1967 | Berg | |
| 3,347,048 A | 10/1967 | Brown et al. | |
| 3,362,127 A | 1/1968 | McGowan | |
| 3,363,381 A | 1/1968 | Forrest | |
| 3,363,382 A | 1/1968 | Forrest | |
| 3,363,383 A | 1/1968 | La Barge | |
| 3,373,071 A | 3/1968 | Fuerst | |
| 3,377,931 A | 4/1968 | Hilton | |
| 3,387,422 A | 6/1968 | Wanzer | |
| 3,397,496 A | 8/1968 | Sohns | |
| 3,444,660 A | 5/1969 | Feichter | |
| 3,449,879 A | 6/1969 | Bloom | |
| 3,460,304 A | 8/1969 | Braeuninger et al. | |
| 3,473,278 A | 10/1969 | Gossen | |
| 3,474,584 A | 10/1969 | Lynch | |
| 3,479,784 A | 11/1969 | Massagli | |
| 3,481,810 A | 12/1969 | Waite | |
| 3,488,828 A | 1/1970 | Gallagher | |
| 3,496,119 A | 2/1970 | Fitzgerald | |
| 3,508,369 A | 4/1970 | Tennison | |
| 3,526,420 A | 9/1970 | Brancaleone | |

(56) References Cited

U.S. PATENT DOCUMENTS

| | | |
|---|---|---|
| 3,535,844 A | 10/1970 | Glaros |
| 3,538,665 A | 11/1970 | Gohner |
| 3,538,819 A | 11/1970 | Gould et al. |
| 3,553,919 A | 1/1971 | Omholt |
| 3,555,762 A | 1/1971 | Costanzo, Jr. |
| 3,570,205 A | 3/1971 | Payne |
| 3,572,224 A | 3/1971 | Perry |
| 3,579,941 A | 5/1971 | Tibbals |
| 3,619,964 A | 11/1971 | Passaro et al. |
| 3,627,362 A | 12/1971 | Brenneman |
| 3,657,852 A | 4/1972 | Worthington et al. |
| 3,665,666 A | 5/1972 | Delcroix |
| 3,671,369 A | 6/1972 | Kvalheim et al. |
| 3,687,773 A | 8/1972 | Wangborg |
| 3,694,983 A | 10/1972 | Couquet |
| 3,696,575 A | 10/1972 | Armstrong |
| 3,707,061 A | 12/1972 | Collette et al. |
| 3,714,747 A | 2/1973 | Curran |
| 3,720,027 A | 3/1973 | Christensen |
| 3,731,445 A | 5/1973 | Hoffmann et al. |
| 3,745,726 A | 7/1973 | Thom |
| 3,758,650 A | 9/1973 | Hurst |
| 3,759,007 A | 9/1973 | Thiele |
| 3,760,544 A | 9/1973 | Hawes et al. |
| 3,768,846 A | 10/1973 | Hensley et al. |
| 3,778,958 A | 12/1973 | Fowler |
| 3,798,111 A | 3/1974 | Lana et al. |
| 3,807,113 A | 4/1974 | Turner |
| 3,808,030 A * | 4/1974 | Bell ................................. 428/44 |
| 3,810,707 A | 5/1974 | Tungseth et al. |
| 3,849,240 A | 11/1974 | Mikulak |
| 3,859,000 A | 1/1975 | Webster |
| 3,884,328 A | 5/1975 | Williams |
| 3,902,293 A | 9/1975 | Witt et al. |
| 3,908,053 A | 9/1975 | Hettich |
| 3,908,062 A | 9/1975 | Roberts |
| 3,921,312 A | 11/1975 | Fuller |
| 3,936,551 A | 2/1976 | Elmendorf et al. |
| 3,953,661 A | 4/1976 | Gulley |
| 3,988,187 A | 10/1976 | Witte et al. |
| 4,059,933 A | 11/1977 | Funk et al. |
| 4,060,437 A | 11/1977 | Strout |
| 4,065,902 A | 1/1978 | Lindal |
| 4,067,155 A | 1/1978 | Ruff et al. |
| 4,074,496 A | 2/1978 | Fischer |
| 4,090,338 A | 5/1978 | Bourgade |
| 4,099,358 A | 7/1978 | Compaan |
| 4,144,689 A | 3/1979 | Bains |
| 4,150,517 A | 4/1979 | Warner |
| 4,158,335 A | 6/1979 | Belcastro |
| 4,164,832 A | 8/1979 | Van Zandt |
| 4,169,688 A | 10/1979 | Toshio |
| 4,186,539 A | 2/1980 | Harmon et al. |
| 4,198,455 A | 4/1980 | Spiro et al. |
| 4,242,390 A | 12/1980 | Nemeth |
| 4,247,390 A | 1/1981 | Knoll |
| 4,292,774 A | 10/1981 | Mairle |
| 4,299,070 A | 11/1981 | Oltmanns et al. |
| 4,316,351 A | 2/1982 | Ting |
| 4,376,593 A | 3/1983 | Schaefer |
| 4,390,580 A | 6/1983 | Donovan et al. |
| 4,426,820 A | 1/1984 | Terbrack et al. |
| 4,449,346 A | 5/1984 | Tremblay |
| 4,455,803 A | 6/1984 | Kornberger |
| 4,461,131 A | 7/1984 | Pressell |
| 4,471,012 A | 9/1984 | Maxwell |
| 4,501,102 A | 2/1985 | Knowles |
| 4,504,347 A | 3/1985 | Munk et al. |
| 4,505,887 A | 3/1985 | Miyata et al. |
| 4,520,062 A | 5/1985 | Ungar et al. |
| 4,561,233 A | 12/1985 | Harter et al. |
| 4,571,910 A | 2/1986 | Cosentino |
| 4,594,347 A | 6/1986 | Ishikawa et al. |
| 4,599,124 A | 7/1986 | Kelly et al. |
| 4,599,841 A | 7/1986 | Haid |
| 4,599,842 A | 7/1986 | Counihan |
| 4,612,745 A | 9/1986 | Hovde |
| 4,621,471 A | 11/1986 | Kuhr et al. |
| 4,641,469 A | 2/1987 | Wood |
| 4,643,237 A | 2/1987 | Rosa |
| 4,653,138 A | 3/1987 | Carder |
| 4,653,242 A | 3/1987 | Ezard |
| 4,672,728 A | 6/1987 | Nimberger |
| 4,683,631 A | 8/1987 | Dobbertin |
| 4,703,597 A | 11/1987 | Eggemar |
| 4,715,162 A | 12/1987 | Brightwell |
| 4,733,510 A | 3/1988 | Werner |
| 4,736,563 A | 4/1988 | Bilhorn |
| 4,738,071 A | 4/1988 | Ezard |
| 4,747,197 A | 5/1988 | Charron |
| 4,757,657 A | 7/1988 | Mitchell |
| 4,757,658 A | 7/1988 | Kaempen |
| 4,769,963 A | 9/1988 | Meyerson |
| 4,796,402 A | 1/1989 | Pajala |
| 4,806,435 A | 2/1989 | Athey |
| 4,819,932 A | 4/1989 | Trotter, Jr. |
| 4,831,806 A | 5/1989 | Niese et al. |
| 4,844,972 A | 7/1989 | Tedeschi et al. |
| 4,845,907 A | 7/1989 | Meek |
| 4,893,449 A | 1/1990 | Kemper |
| 4,894,272 A | 1/1990 | Aisley |
| 4,905,442 A | 3/1990 | Daniels |
| 4,910,280 A | 3/1990 | Robbins, III |
| 4,920,626 A | 5/1990 | Nimberger |
| 4,940,503 A | 7/1990 | Lindgren et al. |
| 4,952,775 A | 8/1990 | Yokoyama et al. |
| 4,953,335 A | 9/1990 | Kawaguchi et al. |
| 4,988,131 A | 1/1991 | Wilson et al. |
| 4,998,395 A | 3/1991 | Bezner |
| 4,998,396 A | 3/1991 | Palmersten |
| 5,003,016 A | 3/1991 | Boeder |
| 5,029,425 A | 7/1991 | Bogataj |
| 5,034,272 A | 7/1991 | Lindgren et al. |
| 5,050,362 A | 9/1991 | Tal et al. |
| 5,070,662 A | 12/1991 | Niese |
| 5,074,089 A | 12/1991 | Kemmer et al. |
| 5,086,599 A | 2/1992 | Meyerson |
| 5,092,095 A | 3/1992 | Zadok |
| 5,113,632 A | 5/1992 | Hanson |
| 5,117,603 A | 6/1992 | Weintraub |
| 5,138,812 A | 8/1992 | Palmersten |
| 5,148,850 A | 9/1992 | Urbanick |
| 5,155,952 A | 10/1992 | Herwegh et al. |
| 5,165,816 A | 11/1992 | Parasin |
| 5,179,811 A | 1/1993 | Walker et al. |
| 5,179,812 A | 1/1993 | Hill |
| 5,216,861 A | 6/1993 | Meyerson |
| 5,244,303 A | 9/1993 | Hair |
| 5,247,773 A | 9/1993 | Weir |
| 5,253,464 A | 10/1993 | Nilsen |
| 5,259,162 A | 11/1993 | Nicholas |
| 5,271,564 A | 12/1993 | Smith |
| 5,274,979 A | 1/1994 | Tsai |
| 5,292,155 A | 3/1994 | Bell et al. |
| 5,295,341 A * | 3/1994 | Kajiwara ..................... 52/586.2 |
| 5,325,649 A | 7/1994 | Kajiwara |
| 5,343,665 A | 9/1994 | Palmersten |
| 5,344,700 A | 9/1994 | McGath et al. |
| 5,348,778 A | 9/1994 | Knipp et al. |
| 5,349,796 A | 9/1994 | Meyerson |
| 5,359,817 A | 11/1994 | Fulton |
| 5,365,713 A | 11/1994 | Nicholas et al. |
| 5,390,457 A | 2/1995 | Sjolander |
| 5,424,118 A | 6/1995 | McLaughlin |
| 5,433,048 A | 7/1995 | Strasser |
| 5,433,806 A | 7/1995 | Pasquali et al. |
| 5,474,831 A | 12/1995 | Nystrom |
| 5,497,589 A | 3/1996 | Porter |
| 5,502,939 A * | 4/1996 | Zadok et al. ................. 52/309.9 |
| 5,527,128 A | 6/1996 | Rope et al. |
| 5,540,025 A | 7/1996 | Takehara et al. |
| D373,203 S | 8/1996 | Kornfalt |
| 5,567,497 A | 10/1996 | Zegler et al. |
| 5,570,554 A | 11/1996 | Searer |

(56) References Cited

U.S. PATENT DOCUMENTS

| | | | |
|---|---|---|---|
| 5,581,967 A | 12/1996 | Glatz | |
| 5,597,024 A | 1/1997 | Bolyard et al. | |
| 5,618,602 A * | 4/1997 | Nelson | 428/60 |
| 5,618,612 A | 4/1997 | Gstrein | |
| 5,623,799 A | 4/1997 | Kowalski | |
| 5,630,304 A | 5/1997 | Austin | |
| 5,657,598 A | 8/1997 | Wilbs et al. | |
| 5,671,575 A | 9/1997 | Wu | |
| 5,685,117 A | 11/1997 | Nicholson | |
| 5,688,569 A | 11/1997 | Gilmore et al. | |
| 5,692,354 A | 12/1997 | Searer | |
| 5,695,875 A | 12/1997 | Larsson et al. | |
| 5,706,621 A | 1/1998 | Pervan | |
| 5,706,623 A | 1/1998 | Brown | |
| 5,719,239 A | 2/1998 | Mirous et al. | |
| 5,735,092 A | 4/1998 | Clayton et al. | |
| 5,736,227 A | 4/1998 | Sweet et al. | |
| 5,765,808 A | 6/1998 | Butschbacher et al. | |
| 5,791,114 A | 8/1998 | Mandel | |
| 5,797,237 A | 8/1998 | Finkell, Jr. | |
| 5,823,240 A | 10/1998 | Bolyard et al. | |
| 5,827,592 A | 10/1998 | Van Gulik et al. | |
| 5,860,267 A | 1/1999 | Pervan | |
| 5,888,017 A | 3/1999 | Corrie | |
| 5,894,701 A | 4/1999 | Delorme | |
| 5,904,019 A | 5/1999 | Kooij et al. | |
| 5,907,934 A | 6/1999 | Austin | |
| 5,930,947 A | 8/1999 | Eckhoff | |
| 5,931,447 A | 8/1999 | Butschbacher et al. | |
| 5,935,668 A | 8/1999 | Smith | |
| 5,941,047 A | 8/1999 | Johansson | |
| 5,943,239 A | 8/1999 | Shamblin et al. | |
| 5,945,181 A | 8/1999 | Fisher | |
| 5,950,389 A | 9/1999 | Porter | |
| 5,968,625 A | 10/1999 | Hudson | |
| 5,971,655 A | 10/1999 | Shirakawa | |
| 5,987,839 A | 11/1999 | Hamar et al. | |
| 5,987,845 A | 11/1999 | Laronde | |
| 5,996,301 A | 12/1999 | Conterno | |
| 6,006,486 A | 12/1999 | Moriau et al. | |
| 6,012,263 A | 1/2000 | Church et al. | |
| 6,021,615 A | 2/2000 | Brown | |
| 6,021,646 A | 2/2000 | Burley | |
| 6,023,907 A | 2/2000 | Pervan | |
| 6,029,416 A | 2/2000 | Andersson | |
| 6,079,182 A | 6/2000 | Ellenberger | |
| 6,094,882 A | 8/2000 | Pervan | |
| 6,101,778 A | 8/2000 | Maartensson | |
| 6,119,423 A | 9/2000 | Costantino | |
| 6,134,854 A | 10/2000 | Stanchfield | |
| 6,141,920 A | 11/2000 | Kemper | |
| 6,143,119 A | 11/2000 | Seidner | |
| 6,148,884 A | 11/2000 | Bolyard et al. | |
| 6,158,915 A | 12/2000 | Kise | |
| 6,182,410 B1 | 2/2001 | Pervan | |
| 6,182,413 B1 | 2/2001 | Magnusson | |
| 6,189,283 B1 | 2/2001 | Bentley | |
| 6,205,639 B1 | 3/2001 | Pervan | |
| 6,209,278 B1 | 4/2001 | Tychsen | |
| 6,216,403 B1 | 4/2001 | Belbeoc'h | |
| 6,216,409 B1 | 4/2001 | Roy et al. | |
| 6,219,982 B1 | 4/2001 | Eyring | |
| 6,230,385 B1 | 5/2001 | Nelson | |
| 6,233,899 B1 | 5/2001 | Mellert et al. | |
| 6,247,285 B1 | 6/2001 | Moebus | |
| 6,253,514 B1 | 7/2001 | Jobe et al. | |
| 6,314,701 B1 | 11/2001 | Meyerson | |
| 6,324,803 B1 | 12/2001 | Pervan | |
| 6,324,809 B1 | 12/2001 | Nelson | |
| 6,332,733 B1 | 12/2001 | Hamberger et al. | |
| 6,345,480 B1 | 2/2002 | Kemper | |
| 6,345,481 B1 | 2/2002 | Nelson | |
| 6,363,677 B1 | 4/2002 | Chen et al. | |
| 6,365,258 B1 | 4/2002 | Alm | |
| 6,385,936 B1 | 5/2002 | Schneider | |
| 6,397,547 B1 | 6/2002 | Martensson | |
| 6,418,683 B1 | 7/2002 | Martensson et al. | |
| 6,421,970 B1 | 7/2002 | Martensson et al. | |
| 6,423,257 B1 | 7/2002 | Stobart | |
| 6,438,919 B1 | 8/2002 | Knauseder | |
| 6,446,405 B1 | 9/2002 | Pervan | |
| 6,505,452 B1 | 1/2003 | Hannig et al. | |
| 6,510,665 B2 | 1/2003 | Pervan | |
| 6,516,579 B1 | 2/2003 | Pervan | |
| 6,517,935 B1 | 2/2003 | Kornfalt et al. | |
| 6,532,709 B2 | 3/2003 | Pervan | |
| 6,536,178 B1 | 3/2003 | Palsson | |
| 6,550,205 B2 | 4/2003 | Neuhofer | |
| 6,588,165 B1 | 7/2003 | Wright | |
| 6,588,166 B2 | 7/2003 | Martensson et al. | |
| 6,591,568 B1 | 7/2003 | Pålsson | |
| 6,601,359 B2 | 8/2003 | Olofsson | |
| 6,606,834 B2 | 8/2003 | Martensson et al. | |
| 6,647,690 B1 | 11/2003 | Martensson | |
| 6,672,030 B2 | 1/2004 | Schulte | |
| 6,681,820 B2 | 1/2004 | Olofsson | |
| 6,682,254 B1 | 1/2004 | Olofsson | |
| 6,711,869 B2 | 3/2004 | Tychsem | |
| 6,729,091 B1 | 5/2004 | Martensson | |
| 6,745,534 B2 | 6/2004 | Kornfalt | |
| 6,763,643 B1 | 7/2004 | Martensson | |
| 6,769,219 B2 | 8/2004 | Schwitte et al. | |
| 6,769,835 B2 | 8/2004 | Stridsman | |
| 6,786,016 B1 | 9/2004 | Wood | |
| 6,805,951 B2 | 10/2004 | Kornfalt et al. | |
| 6,851,241 B2 | 2/2005 | Pervan | |
| 6,854,235 B2 | 2/2005 | Martensson | |
| 6,860,074 B2 | 3/2005 | Stanchfield | |
| 6,880,305 B2 | 4/2005 | Pervan et al. | |
| 6,880,307 B2 | 4/2005 | Schwitte et al. | |
| 6,898,913 B2 | 5/2005 | Pervan | |
| 6,920,732 B2 | 7/2005 | Martensson | |
| 6,931,798 B1 | 8/2005 | Pocai | |
| 6,966,161 B2 | 11/2005 | Palsson et al. | |
| RE38,950 E | 1/2006 | Maiers et al. | |
| 7,021,019 B2 | 4/2006 | Knauseder | |
| 7,086,205 B2 | 8/2006 | Pervan | |
| 7,121,058 B2 | 10/2006 | Palsson et al. | |
| 7,121,059 B2 | 10/2006 | Pervan | |
| 7,131,242 B2 | 11/2006 | Martensson | |
| 7,152,507 B2 | 12/2006 | Solari | |
| 7,210,272 B2 | 5/2007 | Friday | |
| 7,332,053 B2 | 2/2008 | Palsson et al. | |
| 7,347,328 B2 | 3/2008 | Hartwall | |
| 7,398,628 B2 | 7/2008 | Van Horne | |
| 7,441,385 B2 | 10/2008 | Palsson et al. | |
| 7,451,578 B2 | 11/2008 | Hannig | |
| 7,497,058 B2 | 3/2009 | Martensson | |
| 7,552,568 B2 | 6/2009 | Palsson et al. | |
| 7,603,826 B1 | 10/2009 | Moebus | |
| 7,634,884 B2 | 12/2009 | Pervan et al. | |
| 7,726,088 B2 | 6/2010 | Muehleback | |
| 7,856,784 B2 | 12/2010 | Martensson | |
| 7,877,956 B2 | 2/2011 | Martensson | |
| 7,980,039 B2 | 7/2011 | Groeke et al. | |
| 7,980,043 B2 | 7/2011 | Moebus | |
| 8,028,486 B2 | 10/2011 | Pervan et al. | |
| 8,037,657 B2 | 10/2011 | Sjoberg et al. | |
| 8,038,363 B2 | 10/2011 | Hannig et al. | |
| 8,117,795 B2 | 2/2012 | Knauseder | |
| 8,146,318 B2 | 4/2012 | Palsson | |
| 8,234,834 B2 | 8/2012 | Martensson et al. | |
| 8,276,342 B2 | 10/2012 | Martensson | |
| 8,402,709 B2 | 3/2013 | Martensson | |
| 2001/0029720 A1 | 10/2001 | Pervan | |
| 2002/0007608 A1 | 1/2002 | Pervan | |
| 2002/0046526 A1 | 4/2002 | Knauseder | |
| 2002/0046528 A1 | 4/2002 | Pervan et al. | |
| 2002/0095895 A1 | 7/2002 | Daly et al. | |
| 2002/0100242 A1 | 8/2002 | Olofsson | |
| 2002/0112433 A1 | 8/2002 | Pervan | |
| 2002/0127374 A1 | 9/2002 | Spratling | |
| 2002/0148551 A1 | 10/2002 | Knauseder | |
| 2002/0178673 A1 | 12/2002 | Pervan | |

(56) References Cited

U.S. PATENT DOCUMENTS

| | | |
|---|---|---|
| 2002/0178674 A1 | 12/2002 | Pervan |
| 2002/0178681 A1 | 12/2002 | Zancai et al. |
| 2002/0178682 A1 | 12/2002 | Pervan |
| 2002/0189747 A1 | 12/2002 | Steinwender |
| 2003/0009972 A1 | 1/2003 | Pervan et al. |
| 2003/0024199 A1 | 2/2003 | Pervan et al. |
| 2003/0033784 A1 | 2/2003 | Pervan |
| 2003/0084634 A1 | 5/2003 | Stanchfield |
| 2003/0084636 A1 | 5/2003 | Pervan |
| 2003/0094230 A1 | 5/2003 | Sjoberg |
| 2003/0118812 A1 | 6/2003 | Kornfalt |
| 2003/0141004 A1 | 7/2003 | Palmblad |
| 2003/0145540 A1 | 8/2003 | Brunedal |
| 2003/0154678 A1 | 8/2003 | Stanchfield |
| 2003/0159389 A1 | 8/2003 | Kornfalt |
| 2003/0224147 A1 | 12/2003 | Maine et al. |
| 2004/0016197 A1 | 1/2004 | Ruhdorfer |
| 2004/0031225 A1 | 2/2004 | Fowler |
| 2004/0031226 A1 | 2/2004 | Miller |
| 2004/0031227 A1 | 2/2004 | Knauseder |
| 2004/0040235 A1 | 3/2004 | Kurtz |
| 2004/0041225 A1 | 3/2004 | Nemoto |
| 2004/0139678 A1 | 7/2004 | Pervan |
| 2004/0182036 A1 | 9/2004 | Sjoberg et al. |
| 2004/0191461 A1 | 9/2004 | Riccobene |
| 2004/0211143 A1 | 10/2004 | Hanning |
| 2005/0034405 A1 | 2/2005 | Pervan |
| 2005/0144881 A1 | 7/2005 | Tate |
| 2005/0166526 A1 | 8/2005 | Stanchfield |
| 2005/0210810 A1 | 9/2005 | Pervan |
| 2005/0252130 A1 | 11/2005 | Martensson |
| 2006/0101769 A1 | 5/2006 | Pervan |
| 2006/0236642 A1 | 10/2006 | Pervan |
| 2006/0248836 A1 | 11/2006 | Martensson |
| 2007/0006543 A1 | 1/2007 | Engstrom |
| 2007/0028547 A1 | 2/2007 | Grafenauer et al. |
| 2007/0240376 A1 | 10/2007 | Engstrom |
| 2008/0000186 A1 | 1/2008 | Pervan |
| 2008/0134613 A1 | 6/2008 | Pervan |
| 2008/0216434 A1 | 9/2008 | Pervan |
| 2008/0236088 A1 | 10/2008 | Hannig |
| 2008/0271403 A1 | 11/2008 | Palsson |
| 2009/0019806 A1 | 1/2009 | Muehlebach |
| 2009/0064624 A1 | 3/2009 | Sokol |
| 2009/0100782 A1 | 4/2009 | Groeke et al. |
| 2009/0193748 A1 | 8/2009 | Boo et al. |
| 2009/0199500 A1 | 8/2009 | LeBlang |
| 2009/0217615 A1 | 9/2009 | Engstrom |
| 2010/0031599 A1 | 2/2010 | Kennedy et al. |
| 2010/0043333 A1 | 2/2010 | Hannig |
| 2010/0058700 A1 | 3/2010 | LeBlang |
| 2011/0167751 A1 | 7/2011 | Engstrom |
| 2011/0173914 A1 | 7/2011 | Engstrom |
| 2011/0271631 A1 | 11/2011 | Engstrom |
| 2011/0271632 A1 | 11/2011 | Cappelle et al. |
| 2011/0293361 A1 | 12/2011 | Olofsson |
| 2012/0042595 A1 | 2/2012 | De Boe |
| 2012/0055112 A1 | 3/2012 | Engstrom |
| 2012/0216472 A1 | 8/2012 | Martensson et al. |
| 2012/0233948 A1 | 9/2012 | Palsson |
| 2012/0247053 A1 | 10/2012 | Martensson |
| 2012/0291396 A1 | 11/2012 | Martensson |
| 2012/0304590 A1 | 12/2012 | Engstrom |
| 2013/0067840 A1 | 3/2013 | Martensson |

FOREIGN PATENT DOCUMENTS

| | | |
|---|---|---|
| BE | 417526 | 12/1936 |
| BE | 557844 | 3/1960 |
| BE | 1010339 | 6/1996 |
| BE | 1010487 | 10/1998 |
| CA | 991373 | 6/1976 |
| CA | 1169106 | 6/1984 |
| CA | 2226286 | 12/1997 |
| CA | 2252791 | 5/1999 |
| CA | 2289309 | 11/1999 |
| CH | 200949 | 1/1939 |
| CH | 211677 | 1/1941 |
| CH | 211877 | 1/1941 |
| CH | 562 377 | 5/1975 |
| DE | 209979 | 11/1906 |
| DE | 1212275 | 3/1966 |
| DE | 1985418 | 5/1968 |
| DE | 1534802 | 4/1970 |
| DE | 7102476 | 6/1971 |
| DE | 1534278 | 11/1971 |
| DE | 2101782 | 7/1972 |
| DE | 2145024 | 3/1973 |
| DE | 2159042 | 6/1973 |
| DE | 2238660 | 2/1974 |
| DE | 2251762 | 5/1974 |
| DE | 7402354 | 5/1974 |
| DE | 2502992 | 7/1976 |
| DE | 2616077 | 10/1977 |
| DE | 2917025 | 11/1980 |
| DE | 3104519 | 2/1981 |
| DE | 3041781 | 5/1982 |
| DE | 3214207 | 11/1982 |
| DE | 4134452 | 4/1983 |
| DE | 3246376 | 6/1984 |
| DE | 3304992 | 8/1984 |
| DE | 3306609 | 9/1984 |
| DE | 3319235 | 11/1984 |
| DE | 3343601 | 6/1985 |
| DE | 8604004 | 8/1986 |
| DE | 3512204 | 10/1986 |
| DE | 3544845 | 6/1987 |
| DE | 3631390 | 12/1987 |
| DE | 3640822 | 6/1988 |
| DE | 8600241 | 4/1989 |
| DE | 400254-70 | 8/1991 |
| DE | 3932980 | 11/1991 |
| DE | 9300306 | 3/1993 |
| DE | 4215273 | 11/1993 |
| DE | 424530 | 6/1994 |
| DE | 43 44 089 | 7/1994 |
| DE | 9317191 | 3/1995 |
| DE | 296 14 086 | 10/1996 |
| DE | 29703962 | 6/1997 |
| DE | 29710175 | 8/1997 |
| DE | 29711960 | 10/1997 |
| DE | 19651149 | 6/1998 |
| DE | 19709641 | 9/1998 |
| DE | 19821938 | 11/1999 |
| DE | 20001225 | 7/2000 |
| DE | 19925248 | 12/2000 |
| DE | 20018284 | 1/2001 |
| DE | 20017461 | 2/2001 |
| DE | 20027461 | 3/2001 |
| DE | 100 01 076 | 10/2001 |
| DE | 517353 | 5/2002 |
| DE | 10062873 | 7/2002 |
| DE | 10131248 | 1/2003 |
| DE | 10 2005 002 297.9 | 8/2005 |
| DE | 10 2007 035 648 | 1/2009 |
| DE | 2009 022 483.1 | 5/2009 |
| DE | 20 2009 004 530 | 6/2009 |
| DE | 10 2010 004717.1 | 1/2010 |
| DE | 10 2009 038 750 | 3/2011 |
| EP | 0085196 | 8/1983 |
| EP | 0248127 | 12/1987 |
| EP | 0220389 | 5/1992 |
| EP | 0623724 | 11/1994 |
| EP | 0652340 | 5/1995 |
| EP | 0698162 | 2/1996 |
| EP | 000711886 | 5/1996 |
| EP | 0843763 | 5/1998 |
| EP | 0849416 | 6/1998 |
| EP | 0855482 | 7/1998 |
| EP | 0877130 | 11/1998 |
| EP | 0903451 | 3/1999 |
| EP | 0958441 | 11/1999 |
| EP | 0969163 | 1/2000 |

(56) References Cited

FOREIGN PATENT DOCUMENTS

| | | |
|---|---|---|
| EP | 0969164 | 1/2000 |
| EP | 0974713 | 1/2000 |
| EP | 1229181 | 8/2002 |
| EP | 2400076 | 8/2004 |
| EP | 2 034 106 | 3/2009 |
| FI | 843060 | 8/1984 |
| FR | 557844 | 8/1923 |
| FR | 1175582 | 3/1959 |
| FR | 1215852 | 4/1960 |
| FR | 1293043 | 5/1962 |
| FR | 2568295 | 1/1986 |
| FR | 2630149 | 10/1989 |
| FR | 2637932 | 4/1990 |
| FR | 2675174 | 10/1992 |
| FR | 2591491 | 11/1993 |
| FR | 2891491 | 11/1993 |
| FR | 2691691 | 12/1993 |
| FR | 2697275 | 4/1994 |
| FR | 2712329 | 5/1995 |
| FR | 2781513 | 1/2000 |
| FR | 2785633 | 5/2000 |
| FR | 2810060 | 12/2001 |
| GB | 424057 | 2/1935 |
| GB | 599793 | 3/1946 |
| GB | 585205 | 1/1947 |
| GB | 636423 | 4/1950 |
| GB | 812671 | 4/1959 |
| GB | 812871 | 4/1959 |
| GB | 1212983 | 11/1970 |
| GB | 1237744 | 6/1971 |
| GB | 1348272 | 3/1974 |
| GB | 1430423 | 3/1976 |
| GB | 2117813 | 10/1983 |
| GB | 2126106 | 3/1984 |
| GB | 2142670 | 1/1985 |
| GB | 2168732 | 6/1986 |
| GB | 2228753 | 9/1990 |
| GB | 2243381 | 10/1991 |
| GB | 2256023 | 11/1992 |
| IT | 812671 | 4/1959 |
| JP | 5465528 | 5/1979 |
| JP | 57119056 | 7/1982 |
| JP | 64-14838 | 1/1989 |
| JP | 64-14839 | 1/1989 |
| JP | 1178659 | 7/1989 |
| JP | 02285145 | 11/1990 |
| JP | 3-18343 | 2/1991 |
| JP | 3-44645 | 4/1991 |
| JP | 3046645 | 4/1991 |
| JP | 3169967 | 7/1991 |
| JP | 03202550 A * | 9/1991 |
| JP | 4106264 | 4/1992 |
| JP | 4191001 | 7/1992 |
| JP | 5148984 | 6/1993 |
| JP | 6-146553 | 5/1994 |
| JP | 656310 | 8/1994 |
| JP | 6320510 | 11/1994 |
| JP | 752103 | 2/1995 |
| JP | 407052103 | 2/1995 |
| JP | 7076923 | 3/1995 |
| JP | 7180333 | 7/1995 |
| JP | 7229276 | 8/1995 |
| JP | 7279366 | 10/1995 |
| JP | 7300979 | 11/1995 |
| JP | 7310426 | 11/1995 |
| JP | 8086078 | 4/1996 |
| NL | 7601773 | 2/1957 |
| NO | 157871 | 7/1984 |
| NO | 305614 | 5/1995 |
| PL | 26931 | 6/1989 |
| SE | 372051 | 12/1974 |
| SE | 7114900-9 | 12/1974 |
| SE | 7706470 | 12/1978 |
| SE | 450141 | 6/1987 |
| SE | 8206934-5 | 6/1987 |
| SE | 457737 | 1/1989 |
| SE | 462809 | 4/1990 |
| SE | 467150 | 6/1992 |
| SE | 501014 | 10/1994 |
| SE | 9301595-6 | 2/1995 |
| SE | 502994 | 3/1996 |
| SE | 503861 | 9/1996 |
| SE | 509059 | 11/1998 |
| SE | 509060 | 11/1998 |
| SE | 512290 | 2/2000 |
| SE | 512313 | 2/2000 |
| SE | 513189 | 7/2000 |
| SE | 514645 | 3/2001 |
| SE | 0001149 | 10/2001 |
| SU | 363795 | 11/1973 |
| WF | WO 9217657 | 10/1992 |
| WO | WO80/02155 | 10/1980 |
| WO | WO 84/02155 | 6/1984 |
| WO | WO 8703839 | 7/1987 |
| WO | WO 93/13280 | 7/1993 |
| WO | WO 9401628 | 1/1994 |
| WO | WO 9426999 | 11/1994 |
| WO | WO 96/12857 | 5/1996 |
| WO | WO 96/23942 | 8/1996 |
| WO | WO 9623942 | 8/1996 |
| WO | WO 9627719 | 9/1996 |
| WO | WO 9627721 | 9/1996 |
| WO | WO 9630177 | 10/1996 |
| WO | WO 9747834 | 12/1997 |
| WO | WO 9822678 | 5/1998 |
| WO | WO 9824994 | 6/1998 |
| WO | WO 9824995 | 6/1998 |
| WO | WO 98/58142 | 12/1998 |
| WO | WO 9858142 | 12/1998 |
| WO | WO 9901628 | 1/1999 |
| WO | WO 9940273 | 8/1999 |
| WO | WO 9966151 | 12/1999 |
| WO | WO 9966152 | 12/1999 |
| WO | WO 0002214 | 1/2000 |
| WO | WO 0006854 | 2/2000 |
| WO | WO 00/20705 | 4/2000 |
| WO | WO 00/47841 | 8/2000 |
| WO | WO 0056802 | 9/2000 |
| WO | WO 0063510 | 10/2000 |
| WO | WO 0066856 | 11/2000 |
| WO | WO 01/02669 | 1/2001 |
| WO | WO 0120101 | 3/2001 |
| WO | WO 01/31141 | 5/2001 |
| WO | WO 01/51732 | 7/2001 |
| WO | WO 01/51733 | 7/2001 |
| WO | WO 01/75247 | 10/2001 |
| WO | WO 02/081843 | 10/2002 |
| WO | WO 03/083234 | 10/2003 |
| WO | WO 03093686 | 11/2003 |
| WO | WO 2005/040521 | 5/2005 |
| WO | WO 2005/054599 | 6/2005 |
| WO | WO 2005/059269 | 6/2005 |
| WO | WO 2006/043893 | 4/2006 |
| WO | WO 2007/008139 | 1/2007 |
| WO | WO 2007/089186 | 8/2007 |
| WO | WO 2007/141605 | 12/2007 |
| WO | Wo 2008/004960 | 1/2008 |
| WO | WO 2008/068245 | 6/2008 |
| WO | WO 2009/066153 | 5/2009 |
| WO | WO 2009/139687 | 11/2009 |
| WO | WO 2010/082171 | 7/2010 |
| WO | WO 2010/136171 | 12/2010 |
| WO | WO 2011/085788 | 7/2011 |

OTHER PUBLICATIONS

Architectvral Graphic Standards; John Wiley & Sons, Inc.
Bojlesystemet til Junckers boliggulve, Junckers Trae for Livet.
CLIC, Ali-Nr, 110 11 640.
Die mobile; Terbrack; 1968.
Elements of Rolling Practice; The United Steel Companies Limited Sheffield, England, 1993;pp. 116-117.
Encyclopedia of Wood Joints; A Fine Woodworking Book; pp. 1-151; 1992.

(56) References Cited

OTHER PUBLICATIONS

Fibolic Brochure, undated.
Fiboloc Literature, Mar. 1999.
Focus, Information Till Ana Medabetare, Jan. 2001, Kahrs pa Domotex I Hmmover, Tysklm1d, Jan. 13-16, 2001.
Fundamentals of Building Construction Materials and Methods; Copyright 1985; pp. 11. Automated Program of Designing Snap-fits; Aug. 1987; pp.3.
High-Prodution Roll Forming; Society of Manufacturing Engineers Marketing Serivces Depmiment; pp. 189.
Hot Rolling of Steel; Library of Congress Cataloging in Publication Data; Roberts, William L; p. 189.
Knight's American Mechanical Dictionary, vol. III. 1876, definition of scarf.
Knight's American Mechanical Dictionary; 3 Edwm•d H. Knight; vol. III; p. 2051; 1876.
Letter to the USPTO dated May 14,2002, regarding U.S. Appl. No. 90/005,744.
Patent Mit Inter-nationalem, Die Revolution ((von Grund auf)) Fibo-Trespo, Disstributed at the Domotex fair in Hannover, Germany in Jan. 1996.
Plastic Part Technology; 1991, pp. 161-162.
Technoscope; Modern Plastics, Aug. 1991; pp. 29-30.
Traditional Details; For Building Restoration, Renovation, and Rehabilitation: From the 1932-1951 Editions of Architectvral Graphic Standards; Jolm Wiley & Sons, Inc.
Traindustrins Handbook "Snickeriabete", Knut Larsson, Tekno's Handbocker Publikation 12-11 (1952).
U.S. Appl. No. 08/894,966, filed Aug. 1997, Pervan.
United States Court of Appeals for Federal Circuit; 2009-1107,-1122; Decided: Feb. 18, 2010.
United States Court of Appeals of the Federal Circuit; Mandate issued on Apr. 12, 2010; Judgment; 2 pages.
United States District Court Eastern District of Wisconsin; Judgment; Dated Oct. 10, 2008.
United States District Court Eastern District of Wisconsin; Order; Dated Oct. 10, 2008.
United States District Court Eastern District of Wisconsin; Order; Dated May 1, 2008.
United States District Court Eastern District of Wisconsin; Order; Dated Dec. 31, 2008.
United States District Court Eastern of Wisconsin; Pervan Testimony; Trial Day 5 (Official Transcript); pp. 1101-1292.
Whittington's Dictionary of Plastics; Edited by James F. Carley, Ph.D., PE; pp, 443, 461; 1993.
Wood Handbook; Forest Products Laboratory, 1999; "Glossary pp. G-1 to 0-14", Chapter 10, pp. 10-1 to 10.
Copy of Search Report dated Apr. 21, 2001.
Non-Final Office Action for U.S. Appl. No. 10/270,163 dated Dec. 10, 2004.
Final Office Action for U.S. Appl. No. 10/270,163 dated Jun. 2, 2005.
Nin-Final Office Action for U.S. Appl. No. 10/270,163 dated Dec. 14, 2005.
Final Office Action for U.S. Appl. No. 10/270,163 dated May 25, 2006.
Non-Final Office Action for U.S. Appl. No. 11/185,724 dated Sep. 26, 2006.
Non-Final Office Action for U.S. Appl. No. 11/483,636 dated Oct. 11, 2006.
Reexamination No. 90/007, 366 dated Oct. 24, 2006.
Reexamination No. 90/007, 526 dated Dec. 5, 2006.
Non-Final Office Action for U.S. Appl. No. 11/185,724 dated Apr. 19, 2007.
Non-Final Office Action for U.S. Appl. No. 11/483,636 dated Apr. 19, 2007.
Non-Final Office Action for U.S. Appl. No. 11/015,741 dated Sep. 6, 2007.
Non-Final Office Action for U.S. Appl. No. 11/242,127 dated Nov. 1, 2007.
Non-Final Office Action for U.S. Appl. No. 11/185,724 dated Jan. 9, 2008.
Final Office Action for U.S. Appl. No. 10/015,741 dated Feb. 26, 2008.
Non-Final Office Action for U.S. Appl. No. 11/483,636 dated Apr. 3, 2008.
Non-Final Office Action for U.S. Appl. No. 11/242,127 dated Apr. 29, 2008.
Examiner Interview Summary for U.S. Appl. No. 11/015,741 dated May 7, 2008.
Final Office Action for U.S. Appl. No. 11/185,724 dated Jul. 9, 2008.
Non-Final Office Action for U.S. Appl. No. 10/580,191 dated Jul. 16, 2008.
Reexamination No. 90/007,365 dated Aug. 5, 2008.
Final Office Action for U.S. Appl. No. 11/483,636 dated Nov. 20, 2008.
Non-Final Office Action for U.S. Appl. No. 11/242,127 dated Mar. 31, 2009.
Non-Final Office Action for U.S. Appl. No. 12/010,587 dated Jun. 23, 2009.
Non-Final Office Action for U.S. Appl. No. 11/483,636 dated Jul. 21, 2009.
Examiner Interview Summary for U.S. Appl. No. 11/184,724 dated Aug. 13, 2009.
Non-Final Office Action for U.S. Appl. No. 12/278,274 dated Sep. 24, 2009.
Final Office Action for U.S. Appl. No. 11/242,127 dated Nov. 24, 2009.
Non-Final Office Action for U.S. Appl. No. 10/580,191 dated Mar. 10, 2010.
Non-Final Office Action for U.S. Appl. No. 11/483,636 dated Mar. 17, 2010.
Final Office Action for U.S. Appl. No. 12/278,274 dated May 17, 2010.
Final Office Action for U.S. Appl. No. 12/010,587 dated May 25, 2010.
Final Office Action for U.S. Appl. No. 10/580,191 dated Oct. 6, 2010.
Non-Final Office Action for U.S. Appl. No. 12/278,274 dated Nov. 2, 2010.
Non-Final Office Action for U.S. Appl. No. 11/483,636 dated Dec. 7, 2010.
Non-Final Office Action for U.S. Appl. No. 12/010,587 dated Mar. 16, 2011.
Final Office Action for U.S. Appl. No. 12/278,274 dated Apr. 14, 2011.
Final Office Action for U.S. Appl. No. 11/483,636 dated May 24, 2011.
Non-Final Office Action for U.S. Appl. No. 13/048,646 dated May 25, 2011.
Non-Final Office Action for U.S. Appl. No. 12/966,861 dated Jul. 20, 2011.
Non-Final Office Action for U.S. Appl. No. 12/979,086 dated Aug. 3, 2011.
Non-Final Office Action for U.S. Appl. No. 12/010,587 dated Aug. 30, 2011.
Non-Final Office Action for U.S. Appl. No. 11/483,636 dated Sep. 28, 2011.
Decision revoking the European Patent EP-B-1 276 941 dated Oct. 21, 2011.
Final Office Action for U.S. Appl. No. 13/048,646 dated Nov. 1, 2011.
Final Office Action for U.S. Appl. No. 12/966,861 dated Jan. 20, 2012.
Final Office Action for U.S. Appl. No. 12/979,086 dated Jan. 25, 2012.
Final Office Action for U.S. Appl. No. 11/483,636 dated Feb. 7, 2012.
Non-Final Office Action for U.S. Appl. No. 12/966,797 dated Feb. 29, 2012.
Final Office Action for U.S. Appl. No. 13/204,481 dated Mar. 12, 2012.
Notice of Allowance for U.S. Appl. No. 12/966,861 dated Apr. 11, 2012.

(56) References Cited

OTHER PUBLICATIONS

Non-Final Office Action for U.S. Appl. No. 13/437,597 dated Jul. 9, 2012.
Notice of Allowance or U.S. Appl. No. 12/979,086 dated Jul. 19, 2012.
Non-Final Office Action for U.S. Appl. No. 12/747,454 dated Aug. 6, 2012.
Final Office Action for U.S. Appl. No. 12/966,797 dated Aug. 8, 2012.
Non-Final Office Action for U.S. Appl. No. 13/452,183 dated Aug. 8, 2012.
Non-Final Office Action for U.S. Appl. No. 13/204,481 dated Sep. 7, 2012.
Non-Final Office Action for U.S. Appl. No. 13/567,933 dated Sep. 12, 2012.
Non-Final Office Action for U.S. Appl. No. 11/483,636 dated Oct. 10, 2012.
Advisory Action for U.S. Appl. No. 12/966,797 dated Oct. 18, 2012.
European Office Action dated Oct. 19, 2012.
Notice of Allowance for U.S. Appl. No. 13/437,597 dated Oct. 26, 2012.
Non-Final Office Action for U.S. Appl. No. 13/086,931 dated Nov. 7, 2012.
Non-Final Office Action for U.S. Appl. No. 13/492,512 dated Nov. 21, 2012.
Non-Final Office Action for U.S. Appl. No. 13/463,329 dated Nov. 21, 2012.
Notice of Allowance for U.S. Appl. No. 11/483,636 dated Nov. 23, 2012.
Notice of Allowance for U.S. Appl. No. 10/270,163 dated Dec. 13, 2012.
Non-Final Office Action for U.S. Appl. No. 12/966,797 dated Dec. 13, 2012.
Non-Final Office Action for U.S. Appl. No. 13/559,230 dated Dec. 20, 2012.
Non-Final Office Action for U.S. Appl. No. 13/675,936 dated Dec. 31, 2012.
Notice of Allowability for U.S. Appl. No. 11/483,636 dated Jan. 3, 2013.
Notice of Allowance for U.S. Appl. No. 12/747,454 dated Jan. 8, 2013.
Notice of Allowance for U.S. Appl. No. 13/437,597 dated Jan. 9, 2013.
Final Office Action for U.S. Appl. No. 12/010,587 dated Jan. 28, 2013.
Final Office Action for U.S. Appl. No. 13/204,481 dated Feb. 25, 2013.
Non-Final Office Action for U.S. Appl. No. 13/492,512 dated Feb. 26, 2013.
Non-Final Office Action for U.S. Appl. No. 11/015,741 dated Mar. 13, 2013.
Final Office Action for U.S. Appl. No. 13/567,933 dated Mar. 15, 2013.
Notice of Allowance for U.S. Appl. No. 11/242,127 dated Apr. 26, 2013.
Notice of Allowance for U.S. Appl. No. 13/437,597 dated Apr. 29, 2013.
Non-Final Office Action for U.S. Appl. No. 12/747,454 dated May 10, 2013.
Notice of Allowance for U.S. Appl. No. 11/184,724 dated May 20, 2013.
Non-Final Office Action for U.S. Appl. No. 13/559,242 dated Jun. 7, 2013.
Applicant-Iniated Interview Summary for U.S. Appl. No. 13/204,481 dated Jul. 29, 2013.
Corrected Notice of Allowability for U.S. Appl. No. 11/184,724 dated Aug. 1, 2013.
Final Office Action for U.S. Appl. No. 13/086,931 dated Aug. 5, 2013.
Notice of Allowance for U.S. Appl. No. 12/966,797 dated Aug. 7, 2013.

* cited by examiner

FLOORING PANEL OR WALL PANEL AND USE THEREOF

CROSS-REFERENCE TO RELATED APPLICATIONS

This application claims priority to and is a continuation of U.S. patent application Ser. No. 12/979,086, filed on Dec. 27, 2002, which is a continuation of U.S. patent application Ser. No. 12/188,639, filed on Aug. 8, 2008, now U.S. Pat. No. 7,856,784, which is a continuation of U.S. patent application Ser. No. 10/158,945, filed on Jun. 3, 2002, now U.S. Pat. No. 7,497,058, which is a continuation of U.S. patent application Ser. No. 09/637,036, filed on Aug. 10, 2000, now U.S. Pat. No. 6,397,547, which is a continuation of U.S. patent application Ser. No. 08/894,966, filed on Sep. 28, 1997, now U.S. Pat. No. 6,101,778, filed as Application No. PCT/SE96/00256 on Feb. 29, 1996. The entire contents of each of these related applications are fully incorporated by reference herein.

DESCRIPTION

The present invention relates to a flooring panel or wall panel and the use thereof in a wet room.

During the last few years laminated floors have achieved and increased popularity and on many markets they are beginning to replace parquet floors and wall-to-wall carpets. At the production of laminated floors a decorative thermosetting laminate is first produced. This laminate usually consists of a base layer of paper sheets impregnated with phenol-formaldehyde resin and a decorative surface layer consisting of a decor paper sheet impregnated with melamine-formaldehyde resin. The laminate is produced by pressing the different layers at a high pressure and an increased temperature.

The laminate obtained is then glued to a carrier of particle board for instance or used as such without any carrier and it is then called compact laminate. The laminated panel thus produced is then sawn up to a number of floor boards which are provided with groove and tongue at the long sides and the short sides. Often the floor boards produced have a thickness of about 7 mm, a length of 120 cm and a width of about 20 cm. Thereby they can usually be put on top of an existing flooring material at a renovation. According to another alternative, instead one or more of the above decorative sheets can be laminated directly towards a base sheet of particle board for instance.

At the assemblage of such a flooring glue is normally applied in the groove when the floor boards are assembled. Therefore, it will be difficult to change a damaged board or to remove a whole flooring and for instance install it in another room.

To avoid the above problem efforts have been made to achieve floor boards which can be assembled without glue. One such construction is disclosed in the U.S. Pat. No. 5,295,341. There the boards are provided with groove and tongue in the usual way, but here a snap-together system is included in the groove-tongue joint.

These floor boards can be assembled without glue. However, they have the disadvantage that the joints between the boards will be flexible and not rigid. This means that if the surface below the floor boards is not completely even which is usually the case, a gap will be formed between the boards. In these gaps dirt and water can penetrate.

According to the present invention also the last mentioned problem has been solved and a flooring panel or wall panel, preferably of thermosetting laminate having two pairs of parallel side edges has been brought about. Two of these side edges are provided with a locking means in the form of a groove and the other two with a tongue fitting in the groove whereby a tongue/groove joint for assembling of the panels is formed. The groove and the tongue are made of a water tight material and formed with a snap-together joint including one or more snapping webs or the like with corresponding cooperating snapping grooves. The groove in front of the snap-together joint has an entrance opening and continues inside the snap-together joint in a stabilizing groove. The tongue is formed with a rear neck intended to fit in the entrance opening and a forwardly protruding stabilizing part situated in front of the snap-together joint and intended for a tight fit in the stabilizing groove, whereby connecting panels when assembled by the snap-together joints and the stabilizing parts in the stabilizing grooves are fixed to each other and prevented from unintentional separation while at the same time a rigid floor covering or wall covering respectively with water tight joints and without unintentional gaps between the panels is obtained.

According to one preferred embodiment two adjacent side edges of the panel are provided with a groove and the other two side edges with a tongue. At this embodiment the panel is usually rectangular, but it can also be square.

At square panels it is also possible to provide a pair of parallel sides with a groove and the other pair with a tongue. However, the choice of pattern on the surface layer of the panel is limited at this shape.

It is preferred that the groove and the tongue are made of thermoplast, a thermosetting laminate, aluminum or a chipboard or particle board impregnated with a thermoplast. Of course also other water tight materials can be used.

At one embodiment, the groove as well as the tongue are formed as a ledge fixed to the side edges of the panel. Suitably the ledge-formed groove and tongue respectively are then fixed in a recess along the side edges with glue for instance.

The snapping webs can be formed on the upper and/or lower side of the tongue while fitting snapping grooves are formed the groove.

In one preferred embodiment one snapping web is formed on the upper side of the tongue and one on the lower side thereof while the groove has two fitting snapping grooves one at the top and one at the bottom.

If necessary one pair of snapping webs can be formed on the upper side of the tongue and one pair on the lower side thereof. Of course you then need two snapping grooves at the top and two snapping grooves at the bottom of the groove to fit with the snapping webs. This construction will give an extremely strong joint.

Of course the snapping webs can instead be arranged in the groove and the snapping grooves on the tongue.

In one preferred embodiment the width of the stabilizing part is 2-10 mm, preferably 4-10 mm. Generally a wider stabilizing part with fitting stabilizing groove gives a better rigidity of the assembled panels.

The stabilizing part will also assist in a correct assemblage of the panels. Thus, when the stabilizing part moves into the stabilizing groove you get a correct level of the panels and the panels can easily be pushed into the correct position where you do not have any gap between the panels. Of course without any substantial gap between the panels water and dirt are prevented from entering the assembled flooring or wall covering.

As a safe guard against water penetration a seal might be arranged in the inner part of the stabilizing groove for instance.

Preferably the grooves and the tongues run the full length of the side edges of the panels.

The panels can be designed in such a manner that the under side of the groove and the tongue are situated in the same level as the under side of the panel.

The panels can be used for covering floors and walls in ordinary dry rooms. However, due to the rigid and water tight joints the panels can be used also for wet rooms. For such applications the whole panel is preferably made of thermosetting laminate of so-called compact laminate type. Such a laminate does not absorb water.

Another alternative is a non water absorbing base with a water tight surface. The surface may for instance consist of paint, a thermoplastic foil such as polyethylene, or polyvinyl chloride, a paper sheet impregnated with thermosetting resin or of a thermosetting laminate.

One suitable non water absorbing base is a board produced by pressing wood particles or wood chips impregnated with a thermoplastic.

BRIEF DESCRIPTION

The invention will be further explained in connection with the enclosed figures of which FIG. 1 schematically shows a panel 1 according to the invention seen from above. The panel is drawn with a rectangular shape but it can as well be square.

FIGS. 2 and 3 show a cross section through two adjacent edges of two embodiments of a panel where two such panels are to be assembled. The construction according to FIG. 2 is preferred.

DETAILED DESCRIPTION OF THE PREFERRED EMBODIMENT

The panel 1 consists of a base of wood particles impregnated with a thermoplastic with a decorative thermosetting laminate as a surface layer 17 glued on top.

Figures 1, 2, 3:
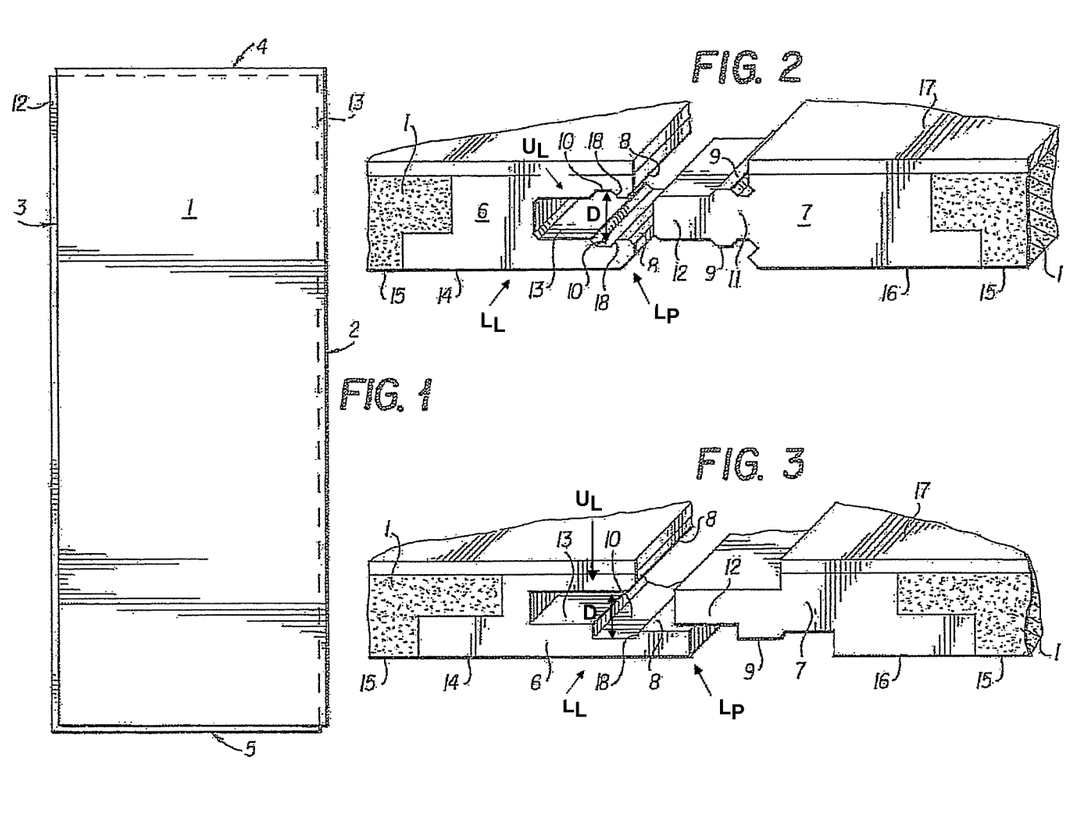

The panel 1 has two pairs of parallel side edges 2, 3 and 4, 5 respectively (FIG. 1). Two of these side edges are provided with locking means in the form of a groove 6 and the other two with a tongue 7 fitting in the groove 6, whereby a tongue/groove joint for assembling of the panels is formed.

The groove 6 and the tongue 7 are made of a water tight material and formed with a snap-together joint. In the embodiment shown in FIG. 2 the snap together joint consists of two snapping webs 9, one on the upper side of the tongue 7 and one on the lower side of tongue, these webs 9 cooperating with two fitting snapping grooves 10.

In front of the snap-together joint, which means the snapping webs 9 and the snapping groove 10, the groove 6 has an entrance opening 8. As FIGS. 2 and 3 illustrate, groove 6 comprises an upper lip $U_L$ and a lower lip $L_L$ disposed on opposing sides of groove opening 8. Inside the snap-together joint the groove 6 continues in a stabilizing groove 13.

The tongue 7 is formed with, a rear neck 11 intended to fit in the entrance opening 8 of the groove 6. In front of the snap-together joint the tongue 7 has a forwardly protruding stabilizing part 12 intended for a tight fit in a stabilizing groove 13.

The parts 9 and 10 included in the snap-together joint are also adapted to each other to give a tight fit and strong joint. To increase this effect further the recesses or snapping grooves 10 are provided with undercut locking edges 18 which cooperate with the backside locking edges of the snapping webs 9 with the same undercut. As FIGS. 2 and 3 illustrate, an upper side of a locking portion $L_P$ (e.g., of lower lip $L_L$) is located in a lower half of a vertical distance D, which is defined between the upper lip $U_L$ of groove 6 and a bottom surface of recess or snapping groove 10.

The groove 6 and the tongue 7 are made of thermosetting laminate and formed as a ledge fixed by glue in a recess along the side edges of the panel. The under side 14 of the groove 6 is situated in the same level as the under side 15 of the panel and the under side 16 of the tongue 7 is situated in the same level as the under side 15 of the panel 1.

When connecting panels have been assembled by the snap-together joints and the stabilizing parts 12 inserted in the stabilizing grooves 13, the panels are fixed to each other and prevented from unintentional separation. A rigid floor covering or wall covering with water tight joints and without unintentional gaps between the panels is obtained. The usual rotation of the snapping webs 9 in the snapping grooves 10 is prevented by the stabilizing parts 12 in the stabilizing grooves 13. Accordingly these parts are essential for the possibility to get a rigid joint between the panels.

The embodiment shown in FIG. 3 is very similar to that according to FIG. 2. The difference is that only the under side of the tongue 7 is provided with a snapping web 9. The upper side is lacking a snapping web. Accordingly there is only one snapping groove 10 at the bottom of the groove 6.

The invention is not limited to the embodiments shown since these can be modified in difference way within the scope of the invention.

What is claimed is:

1. A floor covering comprising:
   a plurality of floor panels comprising:
      a base layer comprising a thermoplastic material;
      a decorative surface layer disposed over the base layer;
      a first pair of opposite side edges having locking elements that are configured to provide a vertical and horizontal locking between two of such panels when in a coupled condition; and
      a second pair of opposite side edges having locking elements that are configured to provide a vertical and horizontal locking between two of such panels when in a coupled condition;
   wherein a groove is provided at one of the side edges of at least said first pair of opposite side edges, the groove comprising an upper lip and a lower lip disposed on opposing sides of a groove opening;
   wherein a recess comprising a locking edge for horizontal locking is provided in the lower lip, said recess having a bottom surface;
   wherein said locking edge is bordering a locking portion distally from said locking edge, said locking portion having an upper side;
   wherein said upper lip is free from locking edges for horizontal locking;
   wherein at said groove a vertical distance is defined between a lower side of the upper lip and the bottom surface of the recess;
   wherein said locking portion is located with its upper side in the lower half of said vertical distance;
   wherein said lower lip extends beyond said upper lip;
   wherein the panels at their side edge opposite to their side edge comprising the groove are provided with a web comprising a locking edge for cooperation with the locking edge at the groove;
   wherein said locking edges comprise inclined locking surfaces;
   wherein the locking elements that are configured to provide a vertical and horizontal locking provide a close fit in the coupled condition; and wherein the panels comprise a substantially uniform thickness and the locking elements are located within the thickness of the panels.

2. The floor covering of claim 1, wherein said recess is formed as an undercut groove portion and wherein said groove comprises a stabilizing groove portion.

3. The floor covering of claim 2, comprising at least one protrusion disposed between a forwardly protruding stabilizing tongue portion and a rear neck portion, wherein said first pair of side edges comprises a tongue.

4. The floor covering of claim 3, wherein a portion of the at least one protrusion is adapted to at least partially fit into the undercut groove portion.

5. The floor covering of claim 3, wherein the stabilizing tongue portion is adapted to at least partially fit into the stabilizing groove portion.

6. The floor covering of claim 3, wherein the rear neck portion is adapted to at least partially fit into a portion of the opening.

7. The floor covering of claim 1, wherein a seal is arranged in a portion of the groove.

8. The floor covering of claim 1, wherein the second pair of side edges comprises locking elements that are configured such that two of such panels at these edges can be joined and locked by a snap action.

9. The floor covering of claim 1, wherein said recess comprises an open upper side, said upper side being defined by a horizontal level defined by the upper side of said locking portion and wherein said recess is located at least with a part thereof underneath the upper lip.

\* \* \* \* \*